United States Patent [19]

Ohki et al.

[11] Patent Number: 5,319,448
[45] Date of Patent: Jun. 7, 1994

[54] METHOD AND APPARATUS FOR CORRECTING COLOR REPRODUCTION

[75] Inventors: Hideaki Ohki, Fujisawa; Masanori Kamiya, Yokohama, both of Japan

[73] Assignee: Hitachi, Ltd., Tokyo, Japan

[21] Appl. No.: 988,667

[22] Filed: Dec. 10, 1992

[30] Foreign Application Priority Data

Dec. 11, 1991 [JP] Japan .................... 3-350477

[51] Int. Cl.⁵ .............................. H04N 9/64
[52] U.S. Cl. ............................ 348/645; 348/649
[58] Field of Search ............. 358/27, 28, 29, 36, 358/37, 21 R, 56, 64; 315/368.11; H04N 9/64

[56] References Cited

U.S. PATENT DOCUMENTS

| 4,167,750 | 9/1979 | Tomimoto et al. | 358/27 |
| 4,306,247 | 12/1981 | Tomimoto et al. | 358/27 |
| 4,544,944 | 10/1985 | Chin . | |
| 4,553,157 | 11/1985 | Hurst, Jr. et al. | 358/27 |
| 5,134,465 | 7/1992 | Ohki et al. | 358/27 |

FOREIGN PATENT DOCUMENTS 23478 5/1982 Japan ................ H04N 9/535

Primary Examiner—James J. Groody
Assistant Examiner—Glenton B. Burgess
Attorney, Agent, or Firm—Antonelli, Terry, Stout & Kraus

[57] ABSTRACT

A method and an apparatus for correcting a color reproduction distortion for each of all the hues are provided. A predetermined demodulating axis of three demodulating axes SR, SG and SB for the three primary colors R, G and B, herein, the R-Y demodulating axis SR is formed by combining the two demodulating axes SR2 and SR3. The demodulating axis SR2 provides a different demodulating gain from the standard demodulating axis. The demodulating axis SR3 provides a different demodulating angle from the standard demodulating axis in addition to the different demodulating gain. Then, a smaller one of the signals demodulated by the demodulating axes SR2 and SR3 is selected. It means that the signal changing along the vector orbit E1 indicated by oblique lines is made to be a color difference signal R-Y. By this function, from the signals demodulated about the demodulating axes SR2 and SR3, the portions with no color reproduction distortion are extracted and synthesized so that no color reproduction distortion takes place with respect to all the hues.

9 Claims, 13 Drawing Sheets

FIG. 9

$$R = \{E_c \cdot A_r \cdot (\theta - \phi r) + A_Y \cdot E_Y\}^\gamma$$

$$G = \{E_c \cdot A_g \cdot (\theta - \phi g) + A_Y \cdot E_Y\}^\gamma \quad \cdots\cdots (1)$$

$$B = \{E_c \cdot A_b \cdot (\theta - \phi b) + A_Y \cdot E_Y\}^\gamma$$

$$R = \frac{(\Delta_{11} X - \Delta_{21} \cdot Y + \Delta_{31} \cdot Z)}{(\Delta_{11} \cdot X_w - \Delta_{21} \cdot Y_w + \Delta_{31} \cdot Z_w)}$$

$$G = \frac{(-\Delta_{12} X + \Delta_{22} \cdot Y - \Delta_{32} \cdot Z)}{(-\Delta_{12} \cdot X_w + \Delta_{22} \cdot Y_w - \Delta_{32} \cdot Z_w)} \quad (2)$$

$$B = \frac{(\Delta_{13} X - \Delta_{23} Y + \Delta_{33} \cdot Z)}{(\Delta_{13} \cdot X_w - \Delta_{23} \cdot Y_w + \Delta_{33} \cdot Z_w)}$$

$$\Delta = \begin{bmatrix} x_r & x_g & x_b \\ y_r & y_g & y_b \\ z_r & z_g & z_b \end{bmatrix} \quad \cdots\cdots (3)$$

$$x = \frac{X}{X+Y+Z} \quad , \quad y = \frac{Y}{X+Y+Z} \quad \cdots\cdots (4)$$

METHOD AND APPARATUS FOR CORRECTING COLOR REPRODUCTION

BACKGROUND OF THE INVENTION

The present invention relates to a method of and an apparatus for, correcting color reproduction implemented by a color display device such as a color fluorescent tube or a color filter, and more particularly to the method of and apparatus for, correcting a color reproduction distortion appearing about all hues.

In a today's color TV receiver, the fluorescent tube for three primary colors (red, blue, green) provides a different xy chromaticity value from that defined according to the NTSC system. As such, the color-reproducing area of the color TV receiver is narrower than that of the NTSC fluorescent tube. This results in a distortion of the color-reproducing characteristic of the color TV receiver.

This is because the color-reproducing area of the NTSC fluorescent tube has been selectively set to the widest area of the NTSC fluorescent tube obtained at that time. Today, this setting is disadvantageous with respect to light of brightness (luminous efficiency) and persistence (short persistence).

FIG. 1 shows a distortion brought about when the fluorescent tube for three primary colors (red, blue, green) of the current color TV receiver provides a different xy chromaticity value from the NTSC fluorescent tube. In FIG. 1, a dotted line indicated by 1 denotes a color-reproducing area reproduced by the NTSC fluorescent tube. A real line indicated by 2 denotes a color-reproducing area reproduced by the current color TV receiver. Circles 3, 4, 5, 6, 7, 8, and 9, respectively, denote colors reproduced in the color-reproducing area 1 of the NTSC fluorescent tube, concretely, green, olive color, flesh color, red, pink, and blue. Dots: denote the similar reproduced colors in the color-reproducing area 2 of the current color TV receiver. An arrow indicates how a location of a reproduced color in the color-reproducing area 1 is changed into another location in the color-reproducing area 2 as a result of a distortion of the reproduced color. The tip of the arrow indicates that a distorted color is reproduced at the location (dot:) in the color-reproducing area 2. Double circles 4 and 9 denote the colors which are subject to no distortion.

As shown in FIG. 1, the color-reproducing area 1 produced by the NTSC fluorescent tube is different from the area 2 produced by the current color TV receiver. The difference brings about a distortion of a color-reproducing characteristic of the color TV receiver which causes a shift of almost all of the reproduced colors toward an axis 10 connected between the olive color 4 and the blue 6. This color shift results in such a color distortion as compression of the green 3 and the flesh color 5 toward the olive color 4. That is, the color reproduction distortion, in principle, takes place in a regular manner. If there is provided a line of axis having a certain hue (line of axis in FIG. 1), the colors actually reproduced by the color TV receiver are distorted to shift toward the axis 10 further than the color-reproduced location defined by the NTSC fluorescent tube. The shift of the colors makes the color reproduction of the color TV receiver inferior.

As an example of solving the shortcoming, a technique has been published in Japanese Patent Publication No. 57-23478. Hereafter, this prior art will be described as referring to Japanese Patent Publication No. 57-23478.

As described above, the reproduced color is distorted to shift toward a certain axis. This prior art is designed to focus on this negative feature. That is, it is arranged to magnify the color change toward both sides of the axis line for correcting the distortion, thereby enhancing the color reproduction.

FIG. 2 shows a uniform chromaticity scale (referred to as a UCS) indicating a color-reproducing characteristic provided as a result of correcting a color reproduction distortion in an example of a color reproduction correcting apparatus. In FIG. 2, 10 indicates an axis line of an olive color toward which the color reproduction distortion is compressed from both sides. That is, the color change is magnified in the direction indicated by arrows 11 so that the compression of each color toward the axis line 10 is corrected for overcoming the color reproduction distortion.

The method for this function will be described with reference to FIG. 3, which is a diagram showing a signal processing characteristic for providing the color reproducing characteristic shown in FIG. 2. In the diagram shown in FIG. 3, an axis of abscissa denotes a phase of an input chroma signal in the color TV receiver and an axis of ordinate denotes a phase of a corrected chromatic signal. If not corrected, the phase relation between these chroma signals is shown by a broken line. If corrected by the prior art, the phase relation between these chroma signals is shown by a real line. This correction causes the color to be shifted in the direction indicated by arrows 11 shown in FIG. 2.

FIG. 4 is a block diagram showing a conventional color reproduction correcting apparatus for correcting a color reproduction distortion according to a d. c. control type hue adjusting system. In FIG. 4, a numeral 12 denotes a bandwidth amplifier. A numeral 13 denotes a reference color carrier oscillator. A numeral 14 denotes a phase-shift circuit. A numeral 15 denotes a 90-degree phase advancer. A numeral 16 denotes a hue adjustor. A numeral 17 denotes a limiter. Numerals 18 and 19 are phase detectors. A numeral 20 denotes a clipper. A numeral 21 denotes a multiplier. A numeral 22 denotes a d. c. power source for adjusting a hue. A numeral 23 denotes an adding circuit. A numeral 30 denotes a color demodulating circuit.

In FIG. 4, a chroma signal contained in the received color video signal is band-limited by a band-pass filter 12. The resulting chroma signal is supplied to a color demodulating circuit 30 and the phase detectors 18, 19 through a limiter 17. A burst signal, picked up by the band-pass amplifier 12, is supplied to the reference color carrier oscillator 13 in which a reference color carrier synchronous in phase with the burst signal can be obtained. The reference color carrier is sent to the phase-shift circuit 14 in which it is phase-shifted. Then, the phase-shifted color carrier is directly supplied to the phase detector 18 as well as the 90-degree phase advancer 15. The phase-advanced color carrier is sent to the phase detector 19. For example, assuming that the phase of the output reference color carrier corresponds to an olive color by properly selecting the characteristics of the phase advancer 14, that is, the phase of the output reference color carrier is located 5 degrees against the phase of the burst signal of the input chroma signal, the phase detector 18 operates as a phase detector for olive color and the phase detector 19 operates as a phase detector for an axis perpendicular to the olive color signal.

FIGS. 5A to 5E are diagrams for describing the operation of the conventional color reproduction correcting apparatus. Assuming that the phase of an olive color signal is a reference phase and the phase of a chrominance signal against the reference phase is $\theta$, the voltage level of an output signal V1 of the phase detector 18 changes like a curve V1 against the phase $\theta$ as shown in FIG. 5A. The voltage level of an output signal V2 of the phase detector 19 changes like a curve V2 as shown in FIG. 5B. The output signal V1 of the phase detector 18 is clipped at a predetermined clipping level by the clipper 20. The resulting signal V3 provides a voltage characteristic changing like a curve V3 against the phase $\theta$ as shown in FIG. 5C. As such, the output signal of the clipper 20 is properly adjusted so as to obtain the amendment 11 of FIG. 2 around the olive color. As an example, herein, the clipping level of the clipper 20 is selected in the range of $-60°$ to $+60°$. The output signal V3 of the clipper 20 is multiplied by the output signal V of the phase detector 19 in the multiplier 21. The multiplier 21 provides an output signal V4 having a voltage level changing like a curve V4 as shown in FIG. 5(D). The output signal (voltage) of the multiplier 21 is added to a d. c. voltage Vd from the d. c. power source 22 in the adding circuit 23. The added voltage is supplied to the hue adjustor 16 as a control voltage.

The hue adjustor 16 serves to change the phase of the reference color carrier sent from the reference color carrier oscillator 13 according to the control voltage sent from the adding circuit 23. The change of the phase is carried out by adding a chrominance sub carrier and its 90-degree phase-shifted carrier to each other at a rate defined according to a control signal. The change of the color sub carrier performed by the hue adjustor 16 is controlled by the control voltage sent from the adding circuit 23, that is, the output voltage Vd of the d. c. power source 22 and the output voltage V4 of the multiplier 21. Assume that the axis of ordinate indicates the output voltage Vd of the d. c. power source 22 and the axis of abscissa indicates the phase $\Delta\theta$ of the color sub carrier of the hue adjustor 16 against the reference color carrier. This phase $\Delta\theta$ changes like a characteristic curve V5 of FIG. 5 with respect to the output voltage Vd of the d. c. power source 22. The control voltage for the hue adjustor 16 is an addition of the d. c. voltage Vd output from the d. c. power source to the voltage V4 output from the multiplier 21 having the characteristic as shown in FIG. 5D. Assuming that the output voltage V4 of the multiplier 21 changes in the range of $-e$ to $+e$ in FIG. 5D, the output voltage of the adding circuit 23 changes in the range of $\pm e$ with respect to the predetermined d. c. voltage Vd applied by the d. c. power source 22 in FIG. 5E. Hence, if the phase of the chroma signal stays out of the range of $-60°$ to $+60°$, the phase $\Delta\theta$ against the d. c. voltage Vd is $\Delta\theta_O$. If, however, the phase of the chroma signal stays in the range, the phase $\Delta\theta$ changes in the range of $\Delta\theta_1$ to $\Delta\theta_2$ ($\Delta\theta_1 < \Delta\theta_2 < \Delta\theta_3$). Such a reference color carrier is fed from the hue adjustor 16 to the color demodulating circuit 30. In the color demodulating circuit 30, the chrominance signal sent from the band-pass amplifier 12 is demodulated. This results in demodulating a chrominance signal having a characteristic of magnifying the change of a hue around the olive color as described in FIG. 3 and correcting a color reproduction distortion as described in FIG. 2.

The foregoing prior art is effective in correcting the colors near the axis line 10 shown in FIG. 2 but has difficulty in correcting all the colors. This shortcoming will be described later.

In the case of a characteristic curve shown in FIG. 3, the color reproduction distortion about the green 3 or the flesh color 5 is improved as shown in FIG. 2. However, with respect to the red 6, the cyan 7, and the pink 8 as shown in FIG. 1, those colors are not included in the amending range of the characteristic curve as shown in FIG. 3. Hence, the color reproduction distortion about these colors is not improved.

FIG. 6 is a UCS diagram showing an example of the method for correcting color reproduction assumed from the conventional color reproduction correcting apparatus shown in FIG. 4.

FIG. 7 is a UCS diagram showing another example of the method for correcting color reproduction assumed from the conventional color reproduction correcting apparatus shown in FIG. 4.

Herein, consider the case where the correcting range of the characteristic curve shown in FIG. 3 is expanded. The corrected result is as shown in FIG. 6. In this case, the correction is executed to magnify the color change toward arrows 11. The red color 6 is shifted from the color-reproduced location 61 before correcting to the color-reproduced location 62 after correcting in the lower of the diagram. Likewise, the cyan color 7 is shifted from the color-reproduced location 71 before correcting to from the color-reproduced location 72 after correcting in the upper of the diagram. The pink color 8 is shifted from the color-reproduced location 81 before correcting to the color-reproduced location 82 after correcting in the lower of the diagram. That is, by magnifying the correcting range of the characteristic curve as shown in FIG. 3, no improvement of the color reproduction distortion about the red 6, the cyan 7, and the pink 8 is carried out.

In FIG. 3, the olive color 4 is defined as the center of correction. In addition to it, a blue color 9 is also defined as the other center of correction. That is, the centers of correction are defined. Considering the case where the correcting range stays from $-90°$ to $+90°$, the corrected result is shown in FIG. 7. In this case, the correction is directed towards two ways, that is, an arrows 11 and arrows 110. By doing such correction, the color reproduction distortion about the pink 8 is improved according to a user's will, while the red color 6 is merely shifted from the color-reproduced location 61 before correcting to the location 63 after correcting in the lower of the diagram and the cyan color 7 is merely shifted from the color-reproduced location 71 before correcting to the location 73 after correcting in the upper of the diagram. It means that the color reproduction distortion about each of these colors is still disadvantageously present.

As described above, the foregoing prior art has difficulty in improving a color-reproducing characteristic about each of the colors in the color reproduction range. Further, to increase the number of colors to be improved, the prior art needs two or more center points of correction. This leads to disadvantageous magnification of a circuit scale according to the increase of the center points.

SUMMARY OF THE INVENTION

It is a main object of the invention to provide a method and an apparatus for correcting color reproduction which are capable of improving color reproduction for each of the colors staying in the range, of a color-reproducing range by a simple circuit arrangement.

It is a further object of the invention to provide an apparatus for correcting color reproduction which needs a reduced circuit scale so that the correcting apparatus is advantageous in light of a mounting area and an economical point of view.

It is another object of the invention to provide an apparatus for correcting color reproduction which is capable of using the existing color demodulating circuit systems in combination for performing color correction in the color difference signal system.

In carrying out the objects, the method for correcting color reproduction according to an aspect of the invention is arranged to set such a demodulating axis of a color signal demodulating circuit as making a color reproduction distortion minimum for each of the hues staying in the color reproduction area. That is, the vector orbit of a demodulated amplitude is changed from a circle (prior art) to a composite of two or more arcs.

The apparatus for correcting color reproduction according to another aspect of the invention is arranged to provide a plurality of color signal demodulating circuits for demodulating a carrier chrominance signal at respective demodulating ratios and angles, and a selecting means for selecting a demodulated chrominance signal from the signals output from the plurality of color signal demodulating circuits.

The color reproduction correcting apparatus according to another aspect of the invention is arranged to provide a signal generating means for generating a chrominance signal from the demodulated chrominance signals with respect to a predetermined demodulating axis, an extracting means for extracting only positive or negative components of the output signal of the signal generating means, and a signal mixing means for mixing the output signal from the extracting means into a predetermined one of the input chrominance signals.

Dependent on the settings of a demodulated axis (demodulating gain and angle) of the color demodulating circuit, the xy chromaticity value on the reproduced color changes. By setting such a demodulated axis of the chrominance signal demodulating circuit as making the color reproduction distortion in any hue minimum, therefore, it is possible to make the color reproduction distortion minimum for each of the hues inside of the color reproduction are and to correct the color-reproducing characteristic.

Each of the color signal demodulating circuits provides such a demodulating axis as making each color reproduction distortion minimum in the range of each hue. By performing an operation with respect to the output signals form the color signal demodulating circuits (for example, a circuit for selecting a minimum value), therefore, it is possible to selectively output the signal from the chrominance signal demodulating circuit having such a demodulating axis as making the color reproduction distortion minimum for each hue. As such, by setting a demodulating gain and angle of the color signal demodulating circuit so that the color reproduction distortion is made minimum, it is possible to correct the color reproduction distortion for each of the hues.

By mixing only positive or negative components of a color signal generated from the demodulated color signals with respect to a predetermined demodulating axis into an input chrominance signal, it is possible to shift the obtained demodulating characteristic of a color signal out of the original demodulating characteristic and make the color reproduction distortions for almost all of the hues minimum.

BRIEF DESCRIPTION OF THE DRAWINGS

Preferred embodiments of the present invention will now be described in conjunction with the accompanying drawings, in which:

FIG. 9 is a view showing mathematical expressions for deriving a UCS diagram for explaining the invention;

DESCRIPTION OF THE PREFERRED EMBODIMENTS

Hereafter, an embodiment of the invention will be described with reference to the drawings.

At first, the description will be oriented to a method for correcting color reproduction according to an embodiment of the invention using an example of an NTSC standard system.

Figure 8:
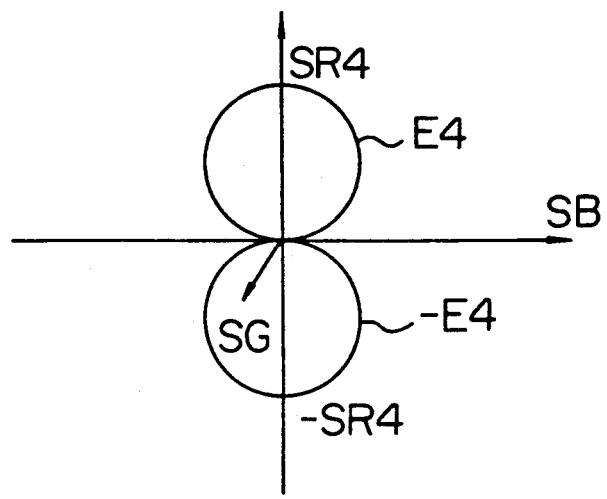
FIG. 8 is a diagram showing a standard demodulating characteristic of an NTSC system for explaining the invention.

FIG. 8 is a diagram showing a standard demodulating characteristic of an NTSC system for explaining the invention.

FIG. 9 is a view showing mathematical expressions for deriving a UCS diagram for explaining the invention.

The standard demodulating axis of a chrominance signal (carrier chrominance signal) of an NTSC system is formed as shown in FIG. 8, in which SR4 denotes a demodulating axis of R-Y, SB denotes a demodulating axis of B-Y, SG denotes a demodulating axis of G-Y, and −SR4 stands for negative components of the demodulating axis of R-Y.

Figure 1:
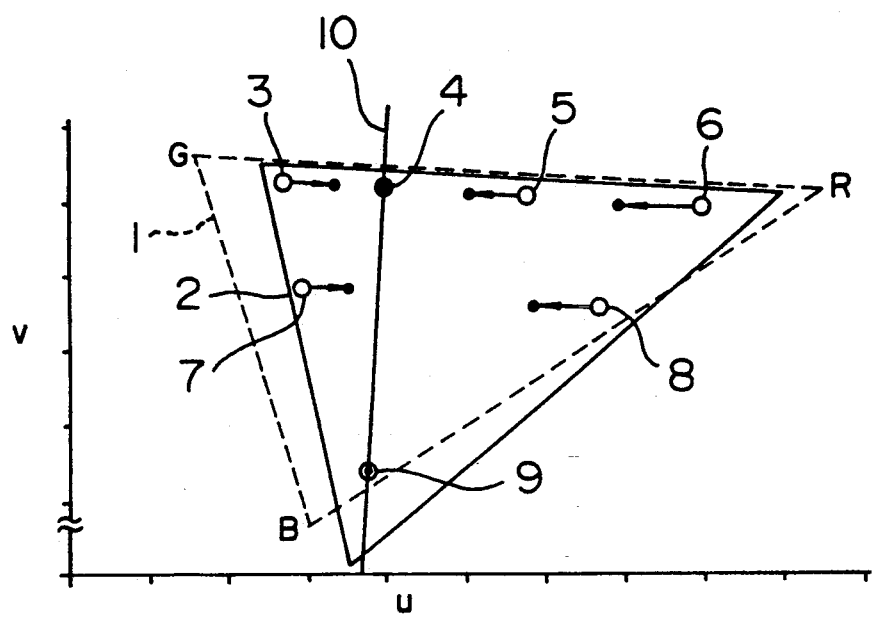
FIG. 1 is a UCS diagram showing a color-reproducing characteristic derived from the demodulating characteristics of the prior art.
Figure 2:
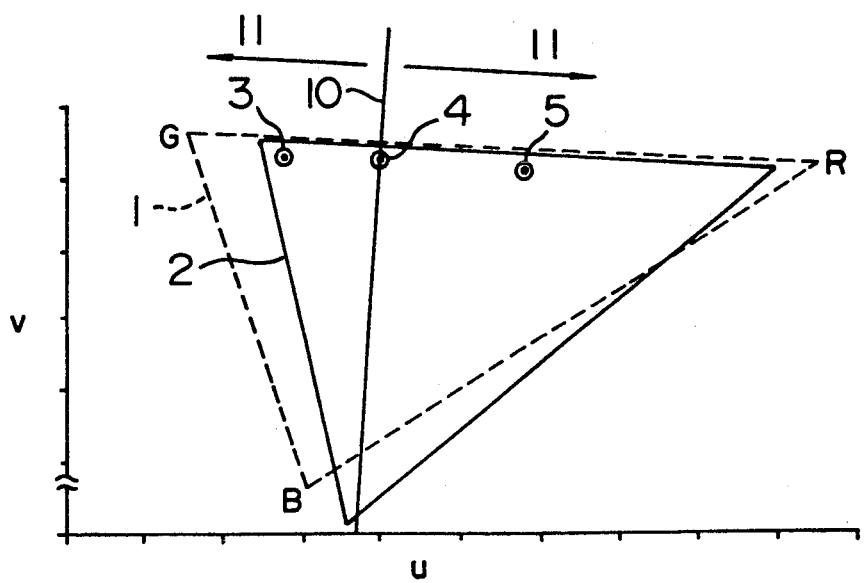
FIG. 2 is a UCS diagram showing a color-reproducing characteristic derived by correcting the color-reproducing distortion in the conventional color reproduction correcting apparatus.
Figure 3:
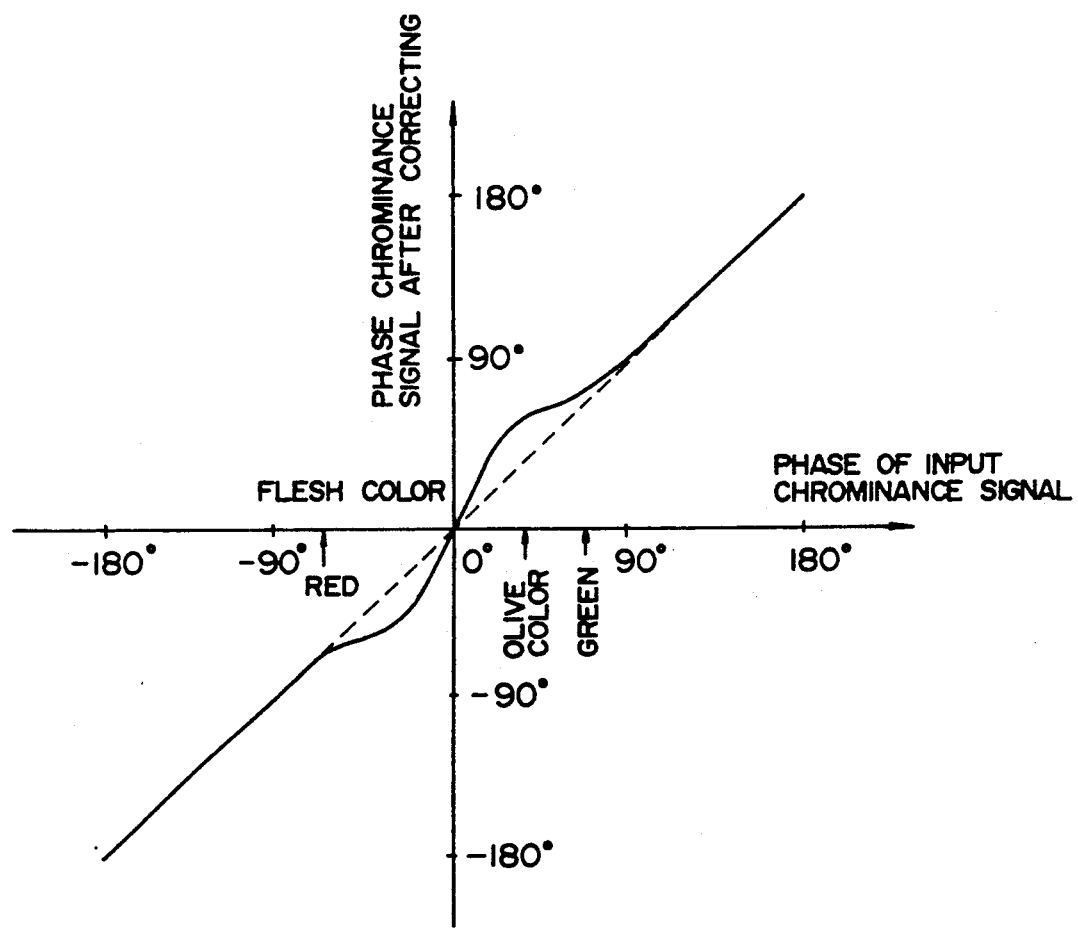
FIG. 3 is a diagram showing a signal processing characteristic provided for obtaining the color-reproducing characteristic shown in FIG. 2.
Figure 4:
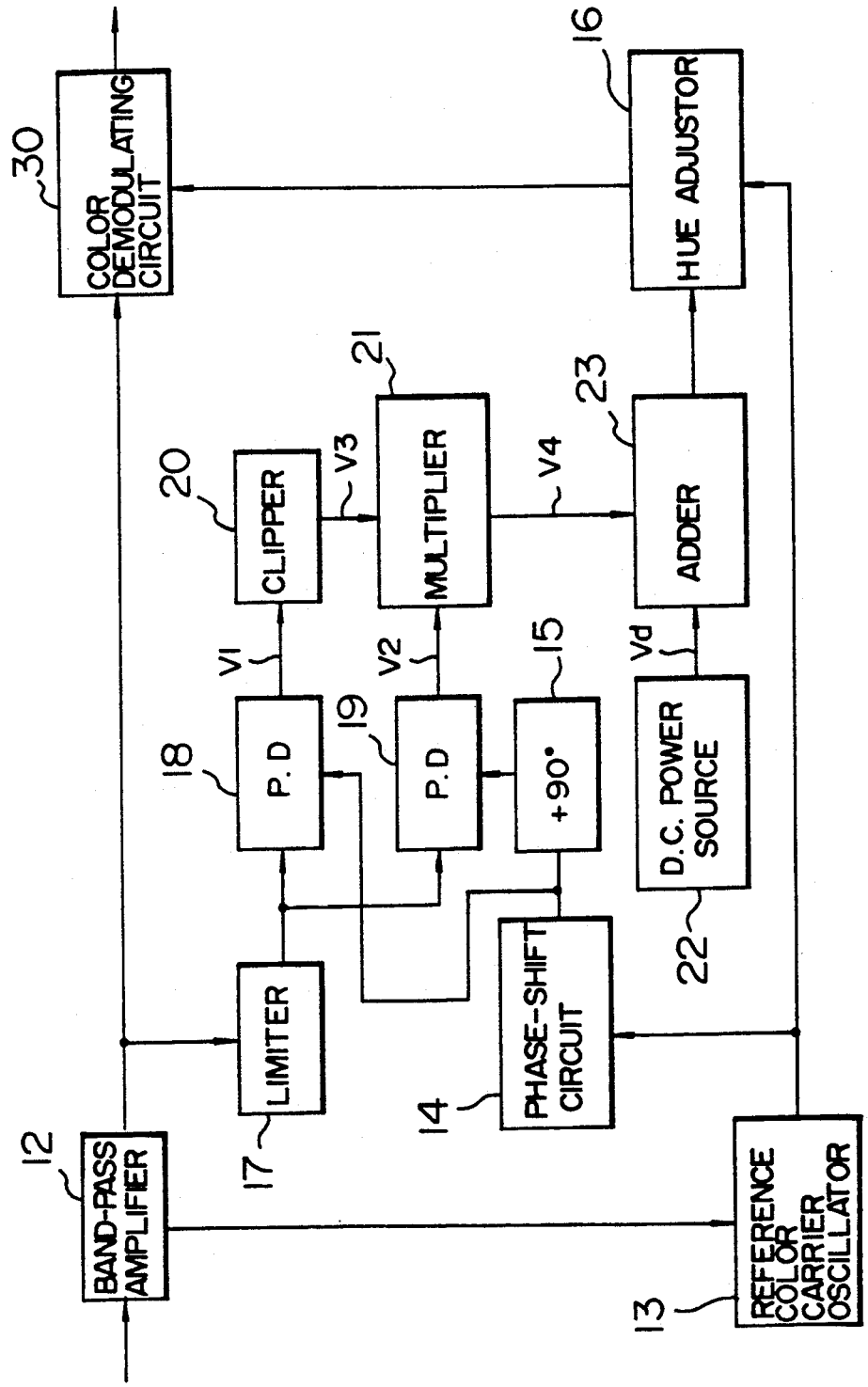
FIG. 4 is a block diagram showing a conventional color reproduction correcting apparatus.
Figure 5:
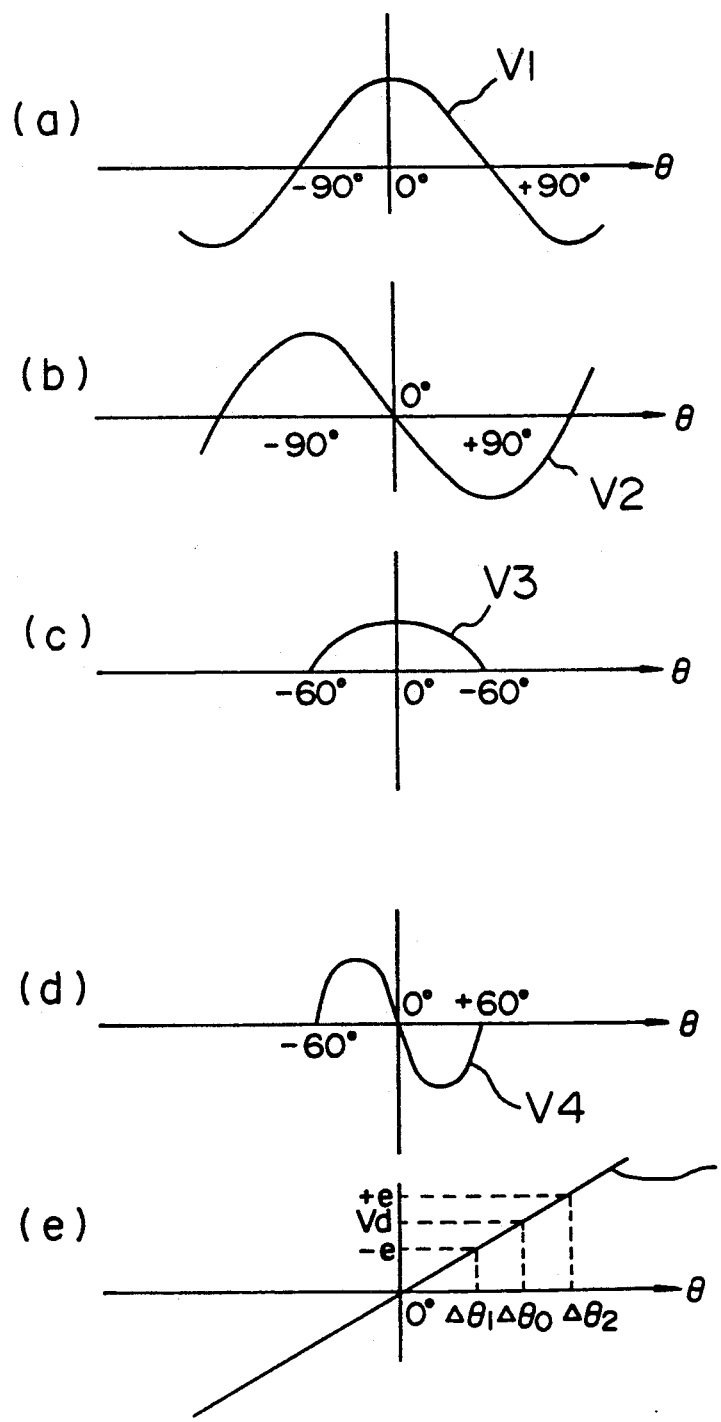
FIG. 5 is a diagram for explaining how the conventional color reproduction correcting apparatus shown in FIG. 4 operates.
Figure 6:
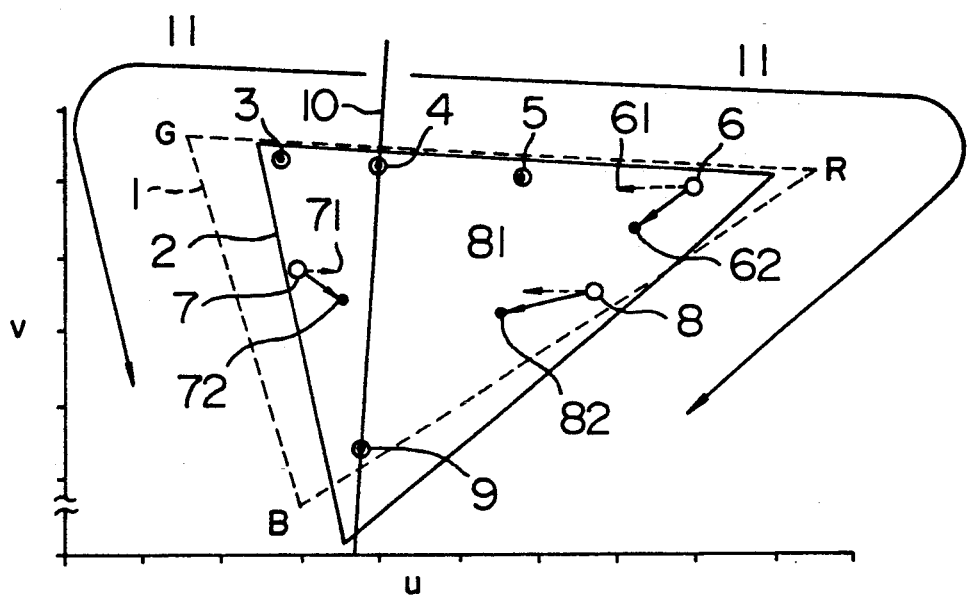
FIG. 6 is a UCS diagram showing a method for correcting color reproduction assumed on the conventional apparatus for correcting color reproduction shown in FIG. 4.
Figure 7:
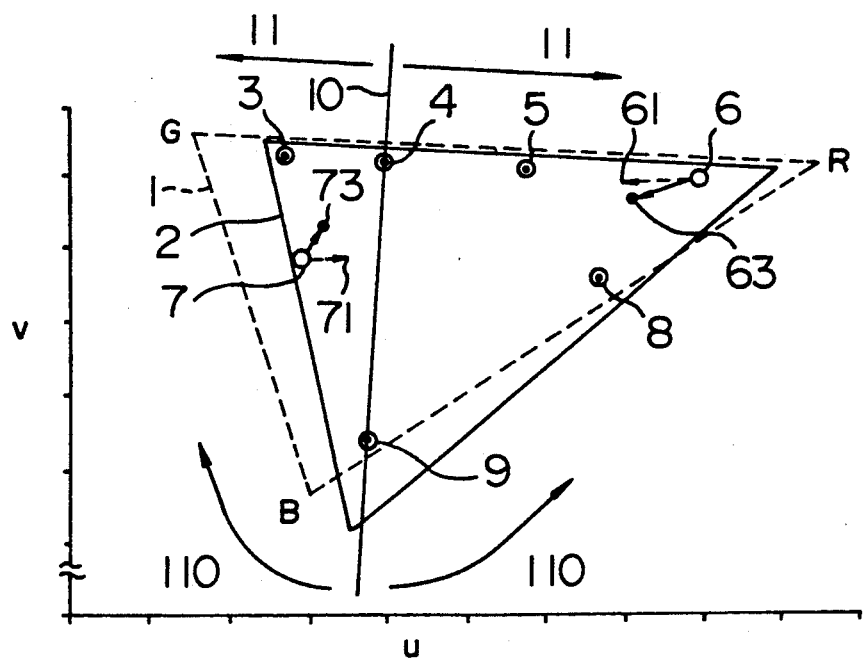
FIG. 7 is a UCS diagram showing another method for correcting color reproduction assumed on the conventional apparatus for correcting color reproduction shown in FIG. 4.

In FIG. 8, the input chrominance signal for any hue is demodulated with respect to the demodulating axis SR4. The amplitude of the demodulated color difference signal (R-Y) is represented depending on the phase of the input chrominance signal. The positive components of the amplitude is represented by a vector orbit indicated by E4 and the negative components thereof is represented by a vector orbit indicated by −E4. The color-reproducing characteristic of this demodulating axis is provided as shown in FIG. 1.

The color-reproducing characteristic of the demodulating axis is derived from the expressions (1), (2) and (3) shown in FIG. 9.

That is, the expression (1) indicates a relation between the input color video signal and the demodulated primary color signals R, G and B, the input color video signal having an amplitude of a chrominance signal denoted by Ec, a color phase angle denoted by $\theta$ and an amplitude of a luminance signal denoted by Ey, in which, in expression (1):

Ar is a demodulating gain of a R-Y demodulating circuit,

Ag is a demodulating gain of a G-Y demodulating circuit,

Ab is a demodulating gain of a B-Y demodulating circuit, $\phi r$ is a demodulating angle of a G-Y demodulating circuit, $\phi b$ is a demodulating angle of a B-Y demodulating circuit, and Ay is a luminance gain and $\gamma$ is a gamma value. The demodulating gains Ar, Ag and Ab correspond to the magnitude of a demodulating axes SR4, SG and SB, respectively. The demodulating angles $\phi r$, $\phi g$ and $\phi b$ correspond to the directions of the demodulating angles SR4, SG and SB.

Assuming that the basic stimulus values for the phosphor of the image receiving tube are Xw, Yw and Zw, the relation between the stimulus values R, G and B against the colorimetric system of the phosphor and the CIE stimulus values X, Y and Z is represented by the expression (2) of FIG. 9, in which $\Delta ij$ denotes a small matrix expression of i-th column and j-th row of the matrix shown in the expression), on the assumption that an xy chromaticity value R, G or B for each color of the phosphor of the image receiving tube is (R): xr, yr, (G): xg, yg and (B): xb, yb.

By inverting the expression (2) for obtaining a value of X, Y or Z from these X, Y and Z, it is possible to obtain the xy chromaticity value of the reproduced color by using the expression (4).

Figure 10:
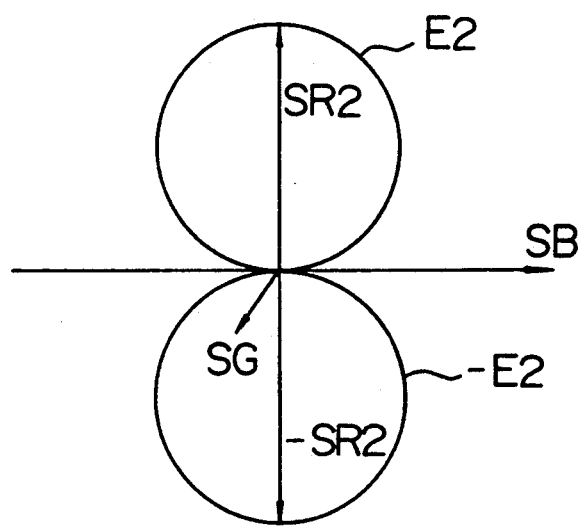
FIG. 10 is a diagram showing a demodulating characteristic provided when a demodulating gain about a R-Y demodulating axis is made larger as compared with the standard demodulating characteristic of the NTSC system.

FIG. 10 is a diagram showing a demodulating characteristic provided when a demodulating gain of the R-Y demodulating axis is made larger than the standard demodulating characteristic of the NTSC system.

Figure 11:
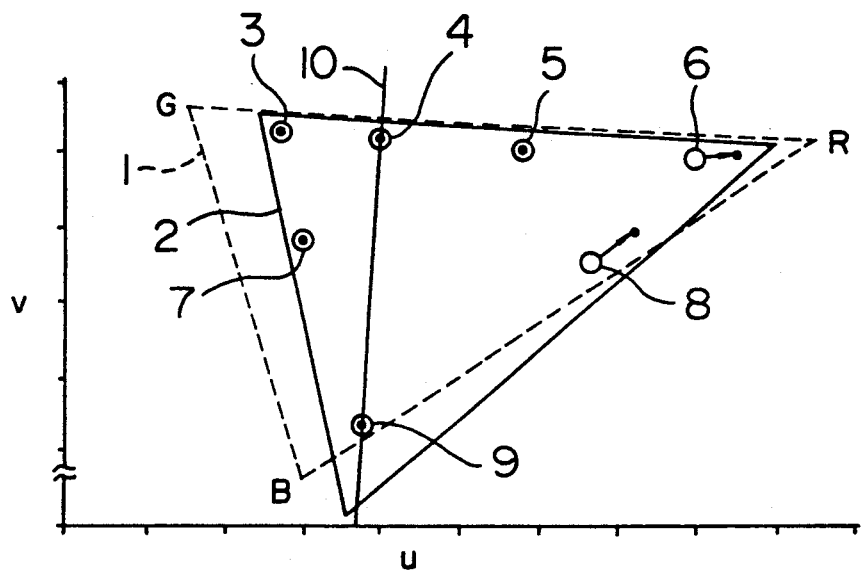
FIG. 11 is a UCS diagram showing a color-reproducing characteristic derived from the demodulating characteristic shown in FIG. 10.

FIG. 11 is a UCS diagram showing a color-reproducing characteristic derived from the demodulating characteristic shown in FIG. 10.

In a case where the demodulating gain Ar of the R-Y demodulating axis is made larger than the standard value of the NTSC system shown in FIG. 8, the demodulating characteristic is provided as shown in FIG. 10, in which SR2 and −SR2 respectively denote R-Y demodulating axes and E2 and −E2 respectively denote vector orbits of positive components and negative components of an amplitude of the demodulating signals derived from the demodulating axes SR2 and −SR2. That is, when only the demodulating gain Ar about the R-Y demodulating axis is made larger, the xy chromaticity value of the reproduced color is changed in accordance with the mathematical expressions (1) to (4) shown in FIG. 9. The resulting color-reproducing characteristic is provided as shown in FIG. 11. As is viewed from FIG. 11, the reproduced colors of the green 3, the flesh color 5 and the cyan 7 are corrected. This is because with respect to the flesh color 5, the increased mixing ratio of red components causes the chromaticity value to move toward the red R and with respect to the green 3 and the cyan 7, conversely, the decreased mixing ratio of red components causes the chromaticity value to move off the red R. However, since the moving ratio around the red is large, the red 6 or the magenta 8 is over-corrected because of a larger mixture of the red components so that the color reproduction distortion may not be properly improved. That is, the demodulating characteristic shown in FIG. 10 is the most approximate demodulating characteristic with respect to each hue of the flesh color 5, green 6 and blue 9.

Figure 12:
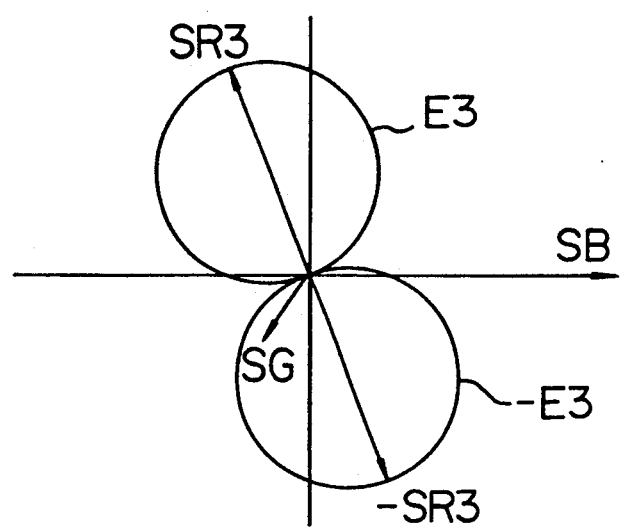
FIG. 12 is a diagram showing a demodulating characteristic provided when a demodulating angle of a R-Y demodulating axis is changed, as compared to the standard demodulating characteristic of the NTSC system.

FIG. 12 is a diagram showing a demodulating characteristic provided when the demodulating angle of the R-Y demodulating axis is shifted as compared to the standard demodulating characteristic of the NTSC system.

Figure 13:
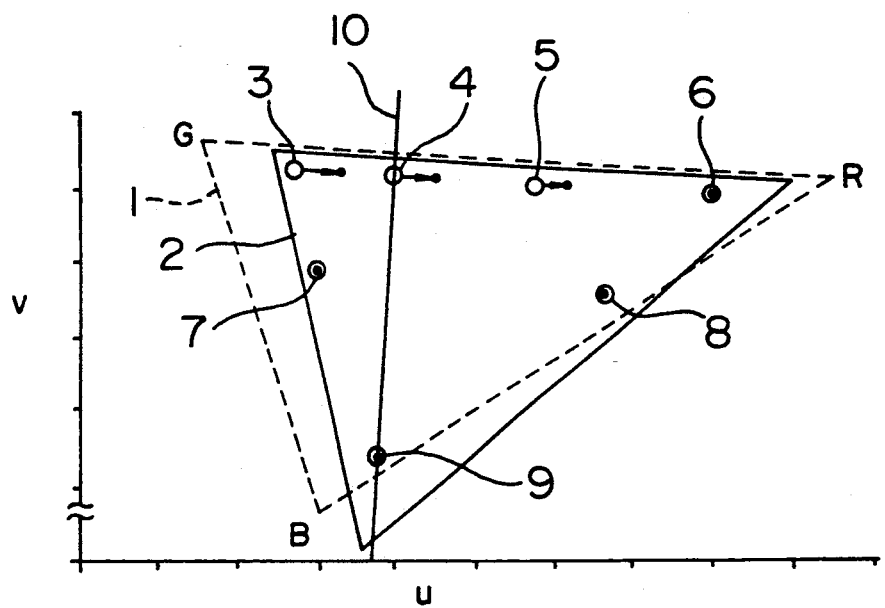
FIG. 13 is a UCS diagram showing a color-reproducing characteristic derived from the demodulating characteristic shown in FIG. 12.

FIG. 13 is a UCS diagram showing a color-reproducing characteristic derived from the demodulating characteristic shown in FIG. 12.

If the demodulating gain Ar and the demodulating angle $\phi r$ of the RY demodulating axis are made larger than the standard values of the NTSC system shown in FIG. 8, the demodulating characteristic is provided as shown in FIG. 12, in which SR4 and −SR3 respectively denote the demodulating axes of R-Y, E3 and −E3 respectively denote vector orbits of positive components and negative components of the amplitude of the demodulating signal derived from the demodulating axes SR3 and −SR3. By changing the demodulating gain Ar and the demodulating angle $\phi r$ of the R-Y demodulating axis as shown in FIG. 12, the resulting color-reproducing characteristic is provided as shown in FIG. 13. That is, the color-reproduction of the red 6, the cyan 7 or the magenta 8 are corrected, because the mixing ratio of red is made approximate. However, with respect to the green 3, the olive color 4 and the flesh color 5, the color reproduction is made inferior to that shown in FIG. 11. This is because the mixing ratio of a red is made so large that the color reproduction may be over-corrected. That is, the demodulating characteristic shown in FIG. 12 is the most approximate demodulating characteristic with respect to the hues of the red 6, magenta 8 and cyan 7.

As described above, the color-reproducing characteristics shown in FIGS. 11 and 13 have the approximate hue ranges and inapproximate ones. By selecting the approximate hue ranges from the characteristics shown in FIGS. 11 and 13 and composing them, it is possible to correct the color reproduction about all the hues.

Figure 14:
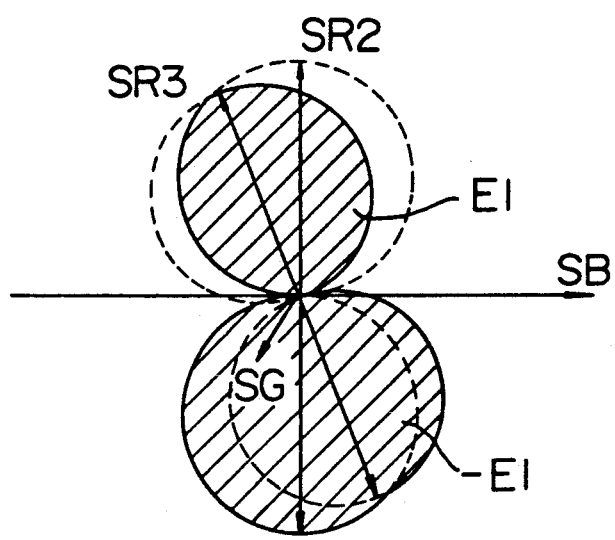
FIG. 14 is a diagram showing a demodulating characteristic provided in the method for correcting color reproduction according to an embodiment of the invention.
Figure 15:
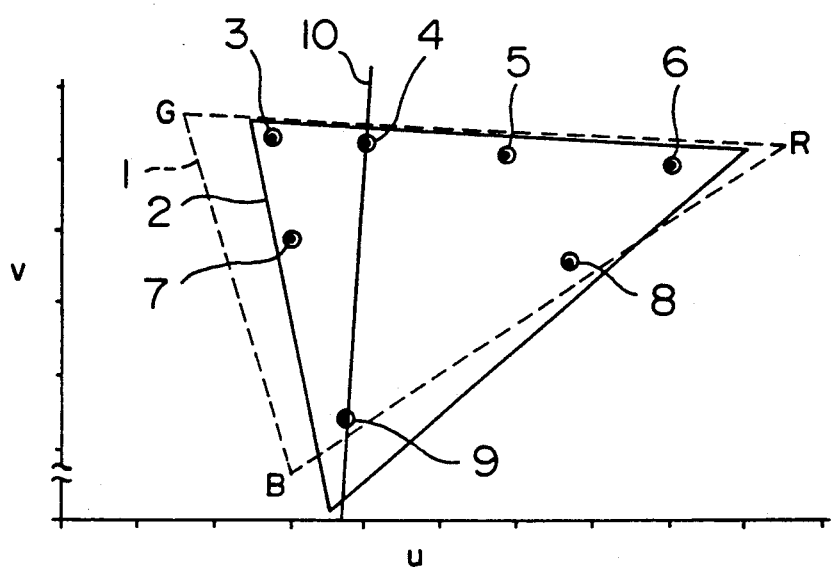
FIG. 15 is a UCS diagram showing a color-reproducing characteristic derived from the demodulating characteristic shown in FIG. 14.

FIG. 14 is a diagram showing a demodulating characteristic provided in the method for correcting color reproduction according to another embodiment of the invention. FIG. 15 is a UCS diagram showing a color-reproducing characteristic derive from the demodulating characteristic shown in FIG. 14.

The demodulating characteristic allowing the approximate hue ranges to be composed to each other is shown in FIG. 14, in which the vector orbits E1 and −E1 indicated by hatching portions are desirous. These vector orbits E1 and −E1 correspond to;

E3 if the amplitude of the vector orbit E2 shown in FIG. 10 > (is greater than) amplitude of the vector orbit E3 shown in FIG. 12 or E2 if the amplitude of the vector orbit E2 shown in FIG. 10 < (is less than) the amplitude of the vector orbit E3 shown in FIG. 12.

The color reproduction based on the demodulating characteristic shown in FIG. 14 is shown in FIG. 15. For selecting the demodulating axis, it is just necessary to follow the foregoing rule.

The vector orbit of the demodulating amplitude is formed of two or more arcs so that the demodulating axis may be reset according to each hue. By this operation, the color reproduction to all the hues is allowed to be corrected.

This embodiment was concerned with the composite characteristic of two kinds of demodulating axes. In actual, three or more kinds of demodulating axes may be used for composing the composite characteristic. As the number of the demodulating axes is increased, the correcting accuracy on the color reproduction distortion is allowed to be improved.

Further, this embodiment has been arranged to correct only one (R, for example) of the three color difference signals and perform the similar correction about the other colors (G and B, for example) for the purpose of improving the correcting accuracy of the color reproduction distortion.

The conventional TV receiver provides as its demodulating characteristic a middle characteristic between the demodulating characteristics shown in FIGS. 10 and 12 and makes the demodulating amplitude of red relatively larger. Hence, for the red color, the allowance for a dynamic range of an output circuit is so small. Hence, the reproduced red seems to be expansive because there are provided too high red smear and color saturation resulting from the saturation of a transistor. This embodiment, however, as is obvious from the demodulating characteristic shown in FIG. 14, suppresses the demodulating amplitude of the red for improving the foregoing shortcoming.

Figure 16:
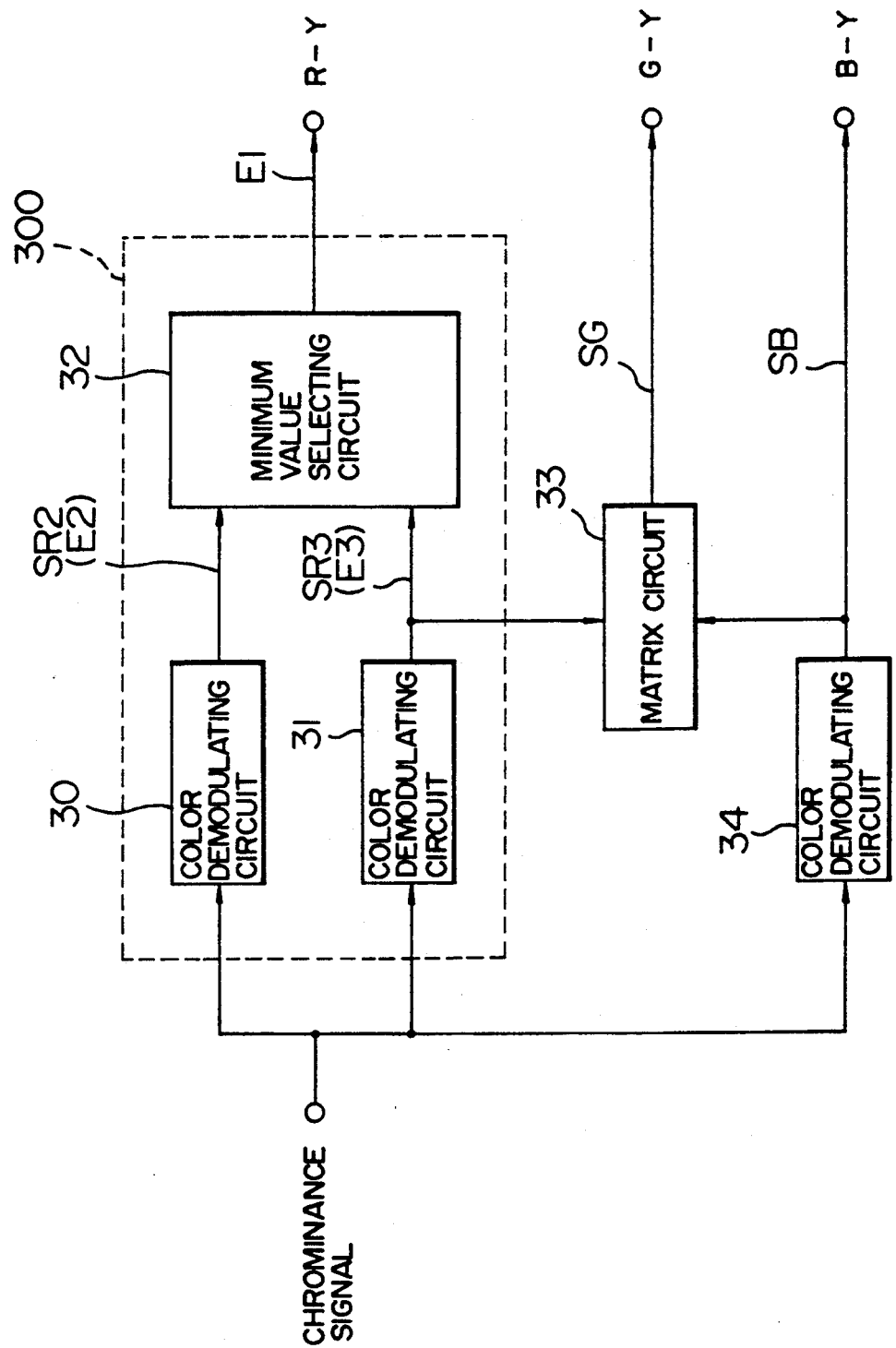
FIG. 16 is a block diagram showing an apparatus for correcting color reproduction according to a first embodiment of the invention.

FIG. 16 is a block diagram showing a circuit for correcting color reproduction according to a first embodiment of the invention. As shown, numerals 30 and 31 denote color demodulating circuits. A numeral 32 denotes a minimum value selecting circuit. A numeral 33 denotes a matrix circuit. A numeral 34 denotes a color demodulating circuit. A numeral 300 denotes an overall apparatus for correcting color reproduction. This embodiment is designed to add to the color demodulating system in a color TV receiver so as to implement the demodulating characteristic shown in FIG. 14.

In FIG. 16, the input chrominance signal is supplied to the color reproduction correcting apparatus 300 and the color demodulating circuit 34 in which the color difference signal B-Y is demodulated. The color reproduction correcting apparatus serves to demodulate the color difference signal R-Y and correct the color reproduction distortion and is arranged to have color demodulating circuits 30, 31 and the minimum value selecting circuit 32. These color demodulating circuits 30 and 31 provide their respective demodulating axes, which are also different from the demodulating axis of the color demodulating circuit 34.

Herein, it is assumed that the color reproduction correcting apparatus 300 is arranged to obtain the demodulating characteristic shown in FIG. 14. For that purpose, the color demodulating circuit 30 provides the demodulating axes SR2 and −SR2 shown in FIGS. 12 and 14. The color demodulating circuit 31 provides the demodulating axes SR3 and −SR3 shown in FIGS. 12 and 14. The color demodulating circuit 34 provides the demodulating axis SB shown in FIG. 14 so that the circuit 34 may demodulate the color difference signal B-Y. The color difference signal SR2 output from the color demodulating circuit 30 has an amplitude to be depicted along the vector orbits E2 and −E2 shown in FIG. 10. The color difference signal SR3 output from the color demodulating circuit 31 has an amplitude to be depicted along the vector orbits E3 and −E3 shown in FIG. 12.

The output signals SR2 and SR3 of the color demodulating circuits 30 and 31 are supplied to the minimum value selecting circuit (MIN) 32 which serves to selectively output a smaller output signal. The minimum value selecting circuit 32 supplies as an output signal the color difference signal R-Y and provides as its demodulating characteristic the composite demodulating characteristic E1 shown by a hatching portion of FIG. 14.

The color demodulating circuit 34 demodulates the signal into a signal SB. The signal SB is supplied as a B-Y signal to the next stage and a matrix circuit 33. The demodulated signal SR3 is supplied from the color demodulating circuit 31 to the matrix circuit 33. The matrix circuit 33 performs an operation of the demodulated signal SR3 and the signal SB for generating a color difference signal G-Y having the demodulating axis SG shown in FIG. 14.

As set forth above, this embodiment can realize the demodulating characteristic as shown in FIG. 14 and offer the excellent color reproduction as shown in FIG. 15. That is, by changing the setting of the demodulating axis according to each hue, it is possible to correct the color reproduction about all the hues.

As compared to the conventional apparatus for correcting color reproduction as shown in FIG. 14, this embodiment needs only a small-scale circuit arrangement and imposes no restrictions on other relevant circuits. Hence, this embodiment is advantageous in light of cost and performance.

Figure 17:
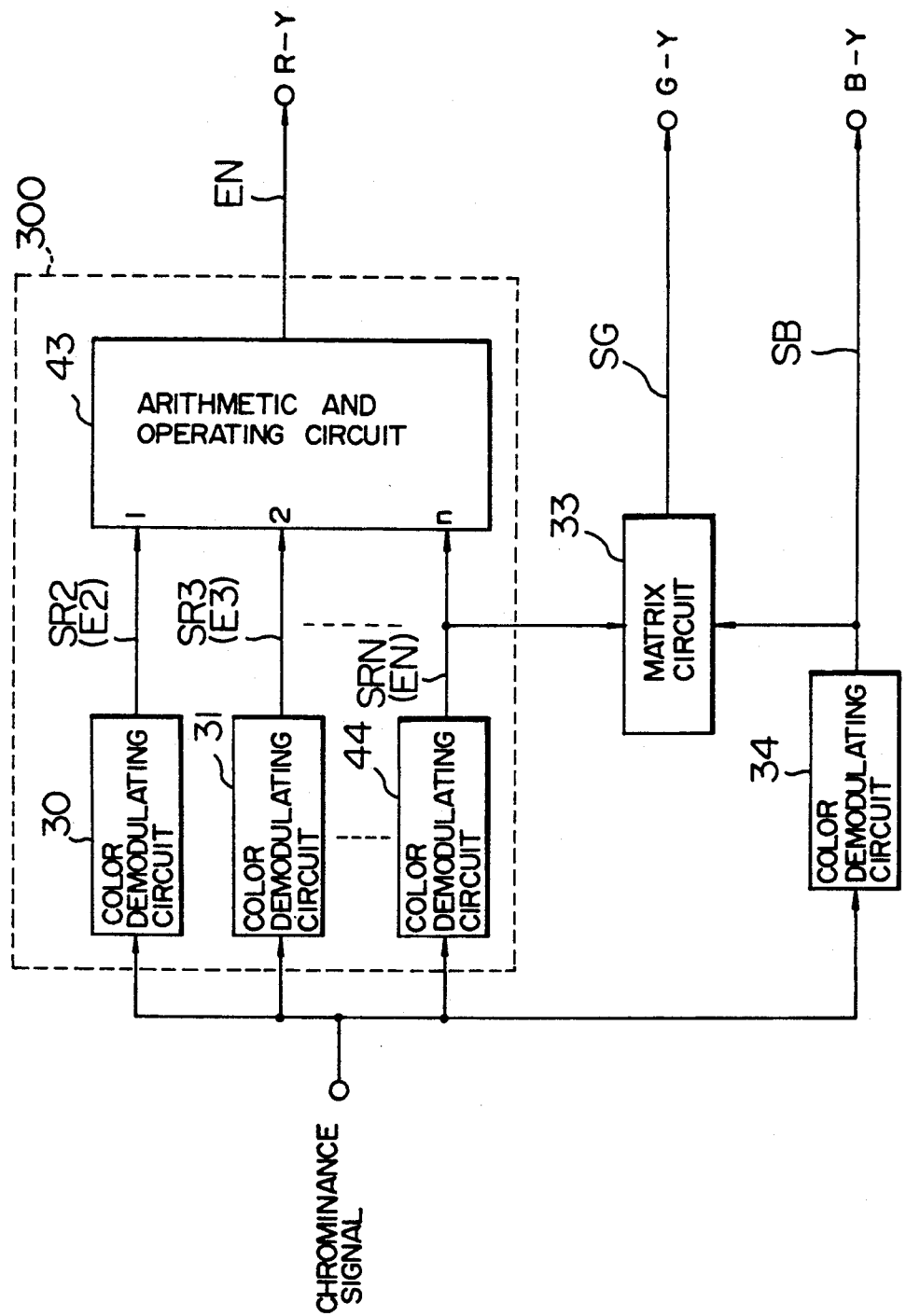
FIG. 17 is a block diagram showing an apparatus for correcting color reproduction according to a second embodiment of the invention, in which n color demodulating circuits are provided.

FIG. 17 is a block diagram showing a color reproduction correcting circuit according to a second embodiment of the invention. In this circuit, n color demodulating circuits 30, 31, ..., 44 are provided. In place of the minimum value selecting circuit 32 shown in FIG. 16, an arithmetic and operating circuit 43 is used. The combination of n color demodulating circuits makes it possible to offer a more excellent composite demodulating characteristic EN.

Figure 18:
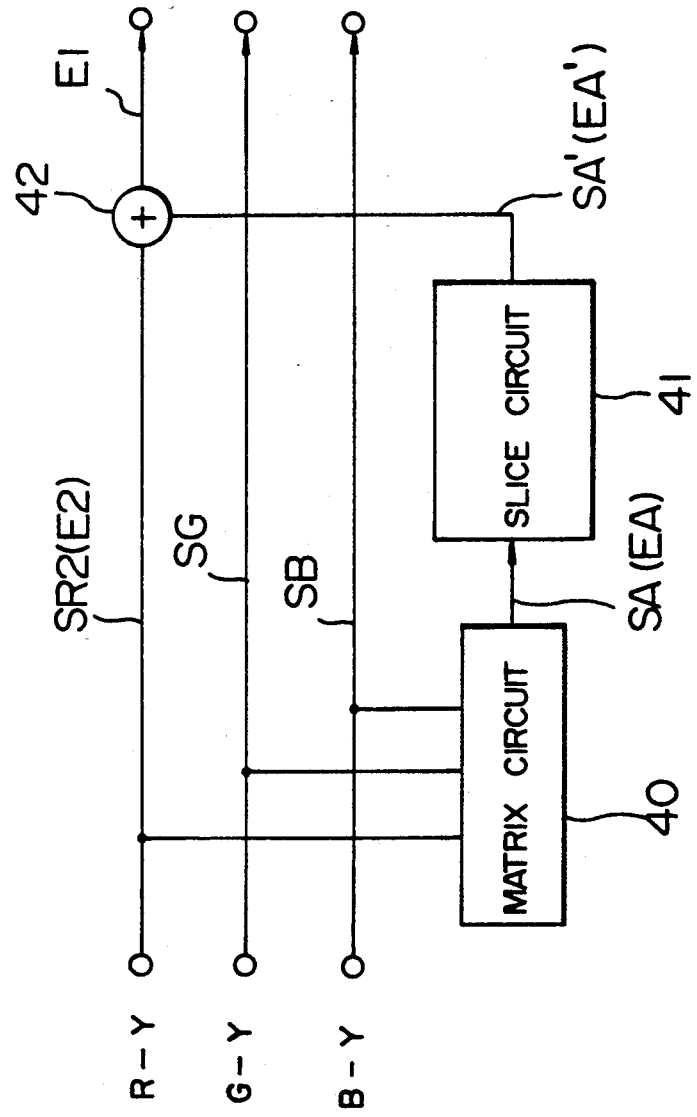
FIG. 18 is a block diagram showing an apparatus for correcting color reproduction according to a third embodiment of the invention.

FIG. 18 is a block diagram showing a color reproduction correcting apparatus according to a third embodiment of the invention. As shown, a numeral 40 denotes a matrix circuit. A numeral 41 denotes a slice circuit. A numeral 42 denotes an adder.

This embodiment is arranged to implement the demodulating characteristic shown in FIG. 14.

In FIG. 18, the color difference signals R-Y, G-Y and B-Y demodulated by a color demodulating circuit (not shown) are input to the correcting apparatus. At first, all of these signals are supplied to the matrix circuit 40. The color difference signal R-Y is supplied to the adder 42 and the remaining color difference signals G-Y and B-Y are output as they are.

Figure 19:
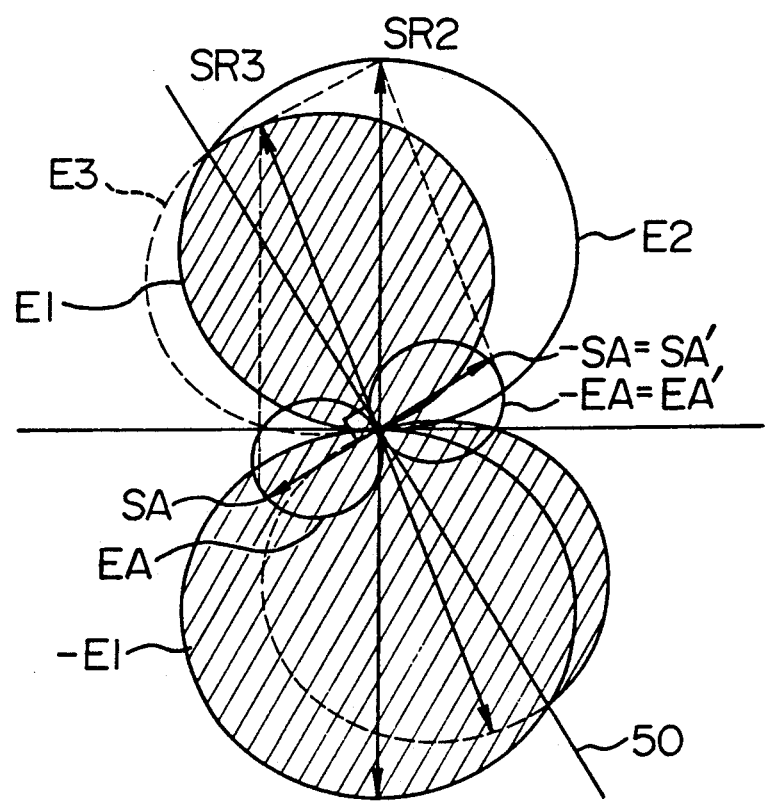
FIG. 19 is an explanatory view for explaining an operation of the embodiment shown in FIG. 17.

FIG. 19 is a characteristic diagram for explaining how the apparatus shown in FIG. 18 operates.

As shown in FIG. 19, the color demodulating circuit for the color difference signal R-Y is arranged to set the demodulating gain and the demodulating angle as shown in FIG. 10. Hence, the vector orbits of the amplitude of this color difference signal are E2 and −E2 like those shown in FIG. 10.

As shown in FIG. 19, the matrix circuit 40 performs the matrix treatment of these color difference signals R-Y, G-Y and B-Y for generating such a signal as being demodulated at a predetermined demodulating gain and the demodulating axes SA and −SA (=SA') of the demodulating angle. This matrix circuit 30 outputs a signal having positive and negative vector orbits EA and −EA(=EA') as shown in FIG. 19. The signal is supplied to the slice circuit 41 in which only the negative components (the components of the vector orbit EA' around the demodulating axis SA') are extracted. The output signal of the slice circuit 41 is supplied to the adder 42 in which it is added to the input color difference signal R-Y.

The aforementioned operation will be described in more detail as referring to FIG. 19 standing for a hue.

As described above, the matrix circuit 40 is arranged to provide a signal demodulated at the predetermined demodulating axes SA and SA'. Then, by adding the vector orbit E2 about the demodulating axis SR2 to the vector orbit EA about the demodulating axis SA, it is possible to obtain a vector orbit E3 about the demodulating axis SR3. The demodulating gain and the demodulating angle are set in a manner to make the demodulating axis SR3 and the vector orbit E3 equal to those shown in FIG. 12. On the other hand, in FIG. 18, the slice circuit 41 serves to extract only the negative components of the output signal of the matrix circuit 40 about the demodulating axis SA. Those extracted components are added to the color difference signal R-Y by the adder 42. When the slice circuit 41 outputs a signal having an amplitude changing along the vector orbit EA', the amplitude of the color difference signal R-Y changes by the amplitude of the signal from the slice circuit 41 in the negative direction. When the slice circuit 41 does not output such a signal but a signal having an amplitude changing along the vector orbit EA', the color difference signal R-Y is made to be a signal whose amplitude changes along the vector orbit E2 (indicated by a thick line) around the demodulating axis SR2. That is, the amplitude of the color difference signal R-Y output from the adder 42 changes along the vector orbit E1. It means that this embodiment shown in FIG. 18 may offer the same effect as the embodiment shown in FIG. 16. In FIG. 19, a line 50 is a tangent line of the vector orbit EA' perpendicular to the demodulating axis SA'. That is, a corrected axis is prepared for an operation. The resulting demodulating characteristic is the same as the composite demodulating characteristic E1 indicated by a hatching portion of FIG. 19.

It has been described so that this embodiment is arranged to demodulate the input color difference signal R-Y around the demodulating axis SR2. In place, the demodulating axis SR3 may be used for demodulation. The axis SR3 needs to apply the polarity of the demodulating axis SA of the output signal of the matrix circuit 40 into an opposite polarity to that shown in FIG. 19.

As set forth above, this embodiment can also realize the same demodulating characteristic as shown in FIG. 14. Hence, the demodulating axis can be variably set according to each hue so that the color reproduction for each of all the hues may be corrected.

As compared to the embodiment shown in FIG. 16, this embodiment needs a smaller scaled circuit arrangement. This is more advantageous in light of the cost.

This embodiment is arranged to correct the color difference signal. Hence, it does not need to modify the existing IC-integrated color demodulating circuit and can be combined with the existing ICs.

As described above, the color reproduction correcting apparatus according to the invention is arranged to set these composite demodulating characteristics for a color display unit having a color reproduction distortion appearing thereon by using a plurality of demodulating axes each of which allows the color reproduction distortion for each hue inside of the color reproduction area to be minimum. Hence, since it has been heretofore difficult to improve the reproducing characteristics for all the colors, the color correction is carried out for the flesh color only, which is particularly memorized by normal TV viewers. On the other hand, the apparatus according to this invention can eliminate the color reproduction distortion on the overall color-reproducing area of the color display unit. This results in greatly improving the color-reproducing characteristic.

Further, this invention needs to correct the color demodulating circuit and the color difference signal. Hence, it does not need a hue detector which would be necessary if a color sub carrier is to be processed. Hence, the invention makes it possible to simplify the circuit arrangement and reduce the scale of the circuit. This is more advantageous in light of the mounting area or the cost.

Moreover, according to the invention, the color difference signal system operates to correct the distortion. It means that the invention may be combined with the existing circuits (ICs) (which are not allowed to be easily modified since these circuits are integrated on ICs). As such, this invention may provide highly availability and easily offer the effect of correcting color reproduction.

What is claimed is:

1. In a color display device arranged to have a color signal demodulating circuit for demodulating a carrier chrominance signal contained in an input color video signal and an image receiving tube using a phosphor having a different xy chromaticity value from a standard xy chromaticity value defined by a broadcasting system, for providing a color display in response to a signal output from said color signal demodulating circuit, a method for correcting color reproduction comprising the step of:

selecting a demodulating axis concerning a red color of said color signal demodulating circuit between a predetermined gain and predetermined angle in a manner to make a color reproduction distortion caused by a different xy chromaticity of said phosphor from said standard xy chromaticity value minimal with respect to each hue produceable by said phosphor.

2. A color reproduction correcting method as claimed in claim 1 wherein a demodulating amplitude of said color signal demodulating circuit has a vector orbit composed of a plurality of arcs from vector orbits associated with said demodulation axis selected to said predetermined gain and predetermined angle.

3. A color reproduction correcting method as claimed in claim 1 comprising the steps of:

processing a plurality of different demodulated input chrominance signals, generating each demodulated chrominance signal about a predetermined demodulating axis, extracting one of positive and negative vector orbit components of said generated chrominance signal, and mixing said extracted components into a color difference signal concerning a red color of said input chrominance signals.

4. In a color display device having an image receiving tube for receiving a color video signal and displaying a color image, said tube arranged to use a phosphor having a different xy chromaticity value from a standard xy chromaticity value defined by a broadcasting system, an apparatus for correcting color reproduction for receiving a carrier chrominance signal of said color video signal, and for demodulating a color difference signal concerning a red color, said apparatus comprising:

a plurality of color signal demodulating means for demodulating a carrier chrominance signal contained in said color video signal at different demodulating ratios and angles, respectively, each color signal demodulating means producing an output signal; and demodulated color signal selecting means for selectively outputting one of said output signals form said plurality of color signal demodulating means by comparing said output signals;

wherein a color reproduction distortion otherwise caused as a result of phosphor having a different xy chromaticity value defined by the broadcasting system, is corrected by said demodulated color signal selecting means selecting a demodulating axis concerning a red color, between a predetermined gain and a predetermined angle in a manner to make a color reproduction distortion caused by a different xy chromaticity of said phosphor from said standard xy chromaticity value minimal with respect to each hue produceable by said phosphor.

5. In a color display device for receiving a color video signal and displaying a color image, said device using a phosphor having an xy chromaticity value different from an xy chromaticity value defined by a broadcasting system, an apparatus for correcting color reproduction comprising:

signal generating means for processing a plurality of different modulated input color signals and generating a demodulated color signal having a predetermined demodulating axis; and a signal mixing means for mixing a signal output from said signal generating means into an input color signal concerning a red color of said input color signals.

6. In a color display device having an image receiving tube for receiving a color video signal and displaying a color image, said tube arranged to use a phosphor having an xy chromaticity value different from a standard xy chromaticity value defined by a broadcasting system, an apparatus for correcting color reproduction comprising:

a signal generating means for processing a plurality of different demodulated input color signals and generating a demodulated color signal having a predetermined demodulating axis;

an extracting means for extracting one of positive and negative vector orbit components of a signal output from said signal generating means; and a signal mixing means for mixing an output signal of said extracting means into an input color signal concerning a red color of said input color signals.

7. A color reproduction correcting method as claimed in claim 1, wherein said predetermined gain and said predetermined angle are different from a standard demodulation gain and standard demodulation angle associated with said broadcasting system.

8. A color reproduction correcting method as claimed in claim 1, wherein the step of selecting includes setting only the demodulating axis concerning the red color to at least one of said predetermined gain and such predetermined angle.

9. A color reproduction correcting method as claimed in claim 4, wherein said demodulated color signal selecting new sets only of the demodulating axis concerning the red color to at least one of said predetermined gain and said predetermined angle.

* * * * *